C. GRAHAM.
Clothes-Wringers.

No. 134,472.                  Patented Dec. 31, 1872.

Witnesses.
Edmund Masson
John R. Young

Inventor.
Chas. Graham, by
Prindle and Co., his
Attys.

UNITED STATES PATENT OFFICE.

CHARLES GRAHAM, OF CINCINNATI, OHIO, ASSIGNOR TO "THE QUEEN CITY WRINGER COMPANY," OF SAME PLACE.

IMPROVEMENT IN CLOTHES-WRINGERS.

Specification forming part of Letters Patent No. 134,472, dated December 31, 1872.

*To all whom it may concern:*

Be it known that I, CHARLES GRAHAM, of Cincinnati, in the county of Hamilton and in the State of Ohio, have invented certain new and useful Improvements in Clothes-Wringers; and do hereby declare that the following is a full, clear, and exact description thereof, reference being had to the accompanying drawing making a part of this specification, in which—

Figure 1:
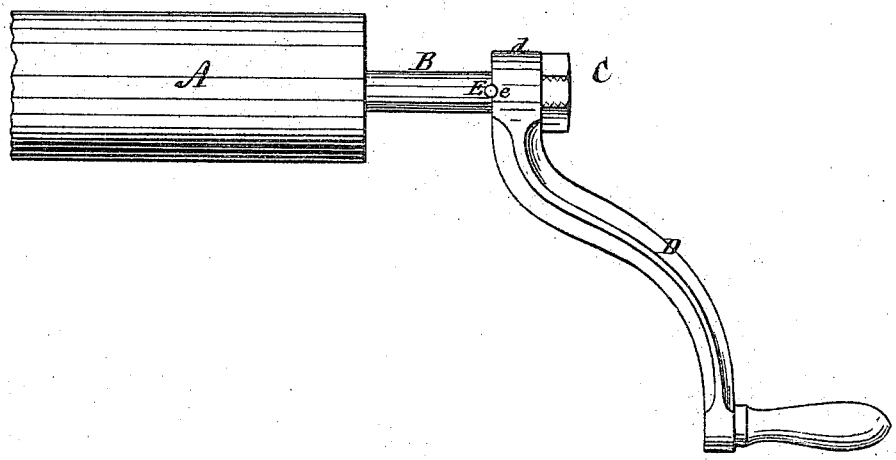
Figure 2:
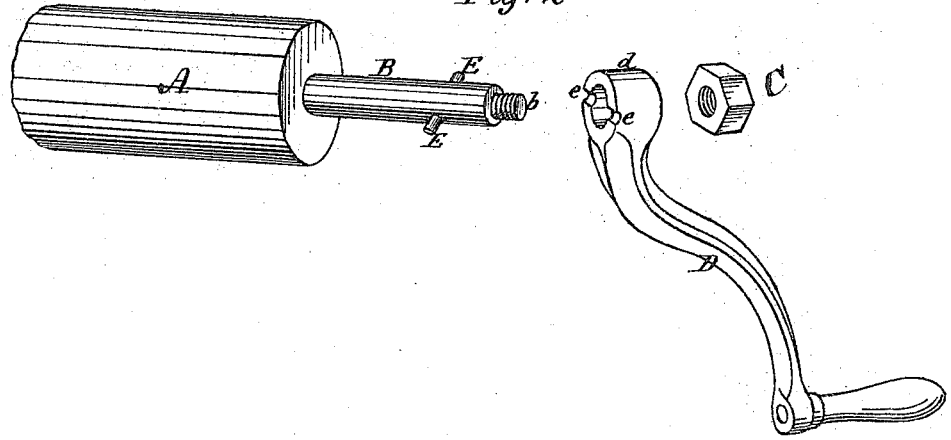

Figure 1 is a side elevation of a roller and crank combined by means of my improved method, and Fig. 2 is a perspective view of the parts detached.

Letters of like name and kind refer to like parts in each of the figures.

In the use of wringers it frequently occurs that the clothing being operated upon assumes such a shape as to render its passage between the rollers impracticable, and necessitates a reversal of the motion of said rollers, in order that said clothing may be withdrawn and rearranged. As ordinarily constructed, the crank is attached to the driving-roller by having its hub screwed upon the reduced threaded end of the same, with its inner face bearing against a shoulder which forms the inner end of such reduced portion, the thread upon the latter and within said hub being what is commonly known as a "right hand." By this construction the crank is screwed to place by being turned in the usual forward direction, and while such motion is continued said crank is firmly locked in place by being pressed against the shoulder named. When, however, it becomes necessary that the motion of the rollers should be reversed, it frequently occurs that the crank becomes loosened, and, ceasing to operate the rollers, renders necessary the loosening of the compressing-springs and the separation of said rollers before the clothing contained between the same can be loosened. To remedy this serious objection and render the attachment of the crank independent of the motion of the rollers is the design of my invention, which consists in providing within the roller-shaft one or more radial pins, which fit into corresponding grooves formed within the inner face of the hub of the crank, and, in combination with a nut screwing upon the outer threaded end of said shaft, insures the relative positions of said parts, substantially as and for the purpose hereinafter specified.

In the annexed drawing, A represents a wringer-roller provided with a central metal shaft, B, upon the extended end of which is cut a screw-thread, $b$, that corresponds to and receives a threaded nut, C, all in the usual manner. Fitted upon or over the end of the shaft B, inside of the threaded portion $b$, is the hub $d$ of a crank, D, which has any desired shape or construction. Extending radially outward from the shaft B, in a line with the inner face of the hub $d$, is one or more pins or studs, E, which, upon their outer sides, fit into correspondingly-shaped grooves $e$ that are formed within the contiguous portion of said hub-face. The nut C being now screwed to place, the hub-crank is firmly held between the same and the studs E so as to prevent all longitudinal motion upon the shaft, while the engagement of said studs with the grooves in said hub effectually prevents the latter from turning in either direction upon said shaft.

The hereinbefore-described means for connecting the crank and shaft is simple, efficient, and comparatively inexpensive, and effectually removes one of the heretofore most serious annoyances arising from the use of wringers.

Having thus fully set forth the nature and merits of my invention, what I claim as new, is—

In combination with the shaft B provided with the threaded end $b$ and nut C, and with the stud or pin E, the crank D provided upon or within its hub $d$ with a groove, $e$, substantially as and for the purpose specified.

In testimony that I claim the foregoing I have hereunto set my hand and seal this 14th day of December, 1872.

CHAS. GRAHAM. [L. S.]

Witnesses:
 W. I. FITZGERALD,
 I. W. BREWSTER.